Nov. 4, 1952     T. W. WILLEMSE     2,617,086
CIRCUIT-ARRANGEMENT FOR CHARGING CAPACITORS
Filed Feb. 15, 1950
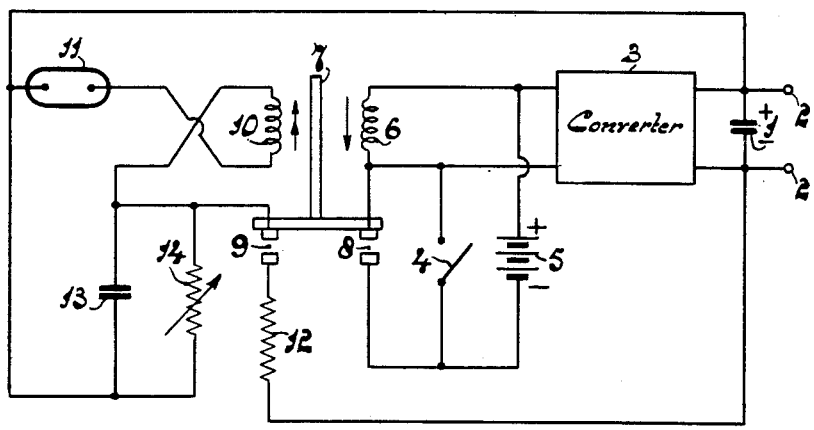
INVENTOR.
Theo Willem Willemse
BY Fred M. Vogel
AGENT Patented Nov. 4, 1952

2,617,086

UNITED STATES PATENT OFFICE 2,617,086

CIRCUIT-ARRANGEMENT FOR CHARGING CAPACITORS

Theo Willem Willemse, Eindhoven, Netherlands, assignor to Hartford National Bank and Trust Company, Hartford, Conn., as trustee Application February 15, 1950, Serial No. 144,367
In the Netherlands February 17, 1949

6 Claims. (Cl. 320—1)

This invention relates to electrical apparatus for charging a capacity from which energy is withdrawn discontinuously.

The charged capacity may be used for many different purposes, one of them being in the field of photography. In this event, the capacity is discharged across a gas-filled discharge tube serving to illuminate the object being photographed.

The principal object of the present invention is to produce a predetermined reproducible charged condition in the capacity, and in addition to obtain this charged condition with a minimum consumption of energy.

According to the invention the device comprises means by which the charging operation of the capacity is terminated automatically as soon as the voltage of the capacity attains a given value and by which no energy is subsequently taken from the capacity.

These means preferably comprise a spark-gap, the current flowing upon a breakdown of the spark-gap being used for interrupting the supply circuit of the capacity.

For portable devices, a source of direct current of low voltage in the form of a dry battery or a storage battery is used as a supply, the voltage thereof being transformed by a converter, for example a vibrator unit including rectifying means or additional commutating contacts into a direct current of high voltage suitable for charging the capacity. Such converters consume a considerable quantity of energy even at zero load, that is, after the charging operation of the capacity is interrupted.

In order to eliminate this consumption of energy and thus to reduce the weight of the supply, the device, in a preferred embodiment of the invention, is furnished with a relay, comprising two coils and two switches which are coupled mechanically and operate in the same direction, one coil (exciter coil) bridging the input terminals of the converter and being connected to the low voltage supply through one of the switches, whereas the second coil (compensation coil) is connected, by way of the second switch and the spark-gap connected in series with the latter, to the output terminals of the converter, the compensation coil, upon a breakdown of the spark-gap, so counteracting the effect of the exciter coil by which the two switches are kept closed, as to reopen them.

When the switch included in the circuit of the spark-gap is caused to open, an electric arc of undue intensity may be struck between its contacts. The intensity of this arc may be reduced by inserting a limiting resistance in the circuit constituted by the series-connection of the spark-gap, the compensation coil and the said switch. The value of the said limiting resistance may be made independent of the minimum required current of the compensation coil, if the series-connection constituted by the spark-gap and the compensation coil is shunted by a condenser.

By bridging this condenser by a resistance (shunt resistance) a voltage divider is obtained which is connected to the capacity when the second switch is closed. This permits the breakdown voltage of the spark-gap to be made much smaller than the voltage at which the charging operation of the capacity is terminated.

In this improved circuit-arrangement the voltage of the capacity to be attained may be made adjustable without entailing a change in the breakdown voltage of the spark-gap by making variable either the shunt resistance or the limiting resistance or both of them.

The charging operation of the capacity is initiated by bringing the armature of the said relay into the closing condition of the two switches. For different uses of the charging device, particularly when it is carried on the operator's back, it is advisable, according to the invention, to provide a control switch, preferably a push button switch, in parallel with the switch of the relay through which the exciter coil is connected to the supply. This control switch may be so provided as to be easily accessible for the operator.

In order that the invention may be more clearly understood and carried into effect it will now be described more fully with reference to the accompanying drawing schematically illustrating a preferred embodiment of the invention.

In the drawing, the reference numeral 1 designates a capacity from which energy is taken in a discontinuous manner at terminals 2, for example by a gas-discharge tube acting as a flash source for making photographic exposures. Capacity 1 is charged with direct current of high voltages by a converter 3 which, by way of a control switch 4, may be connected to a source of direct current 5 of low voltage, for example a dry battery. An exciter coil 6 of a relay, the armature 7 of which actuates two switches 8 and 9, is connected in parallel with the input terminals of the converter. Switch 8 is connected in parallel with control switch 4 which may take the form of a push button switch. By closing switch 4 the input terminals of converter 3 are connected to battery 5 so that capacity 1 is charged. At the same time exciter coil 6 is connected to battery 5.

Due to this, armature 7 of the relay moves in the direction of the single arrow and closes switches 8 and 9. Switches 8 and 9 remain closed, even after opening of the control switch 4, since exciter coil 6 remains connected to battery 5 through the closed switch 8. The input terminals of converter 3 are now also connected through switch 8 to battery 5, so that the charging operation of the capacity is continued. In this manner switch 8 acts as a take-over switch for the control switch 4.

The relay furthermore comprises a winding 10 which, in series with a spark-gap 11, for example a gas-discharge tube, and the closed switch 9 is connected to the output terminals of converter 3. The voltage across the said output terminals depends upon the charged condition of capacity 1 connected thereto. As soon as this voltage attains a value at which the spark-gap breaks down, winding 10 is traversed by a current which causes armature 7 to move in the direction of the double arrow against the action of exciter coil 6. In this manner switches 8 and 9 are reopened and so remain until control switch 4 is again closed. Consequently, winding 10 acts as a compensation winding for the exciter coil 6.

When switch 9 opens, an electric arc of undue intensity may be struck between its contacts. The intensity of this arc can be reduced by inserting a limiting resistance 12 in the circuit constituted by the series-connection of spark-gap 11, compensation winding 10 and switch 9. The value of this limiting resistance can be made independent of the minimum required current of compensation winding 10, if the series-connection consisting of spark-gap 11 and compensation winding 10 is shunted by condenser 13, the latter acting as a supply of current for the compensation winding.

In the circuit-arrangements so far described, the breakdown voltage of spark-gap 11 corresponds to that voltage of capacity 1 at which the charging operation must be terminated, or is only slightly different therefrom. In one embodiment of the invention, however, the breakdown voltage of spark-gap 11 can be made materially lower than the desired maximum voltage of capacity 1 by shunting condenser 13 by a resistance 14. This shunt resistance 14 and limiting resistance 12 together constitute a voltage divider which is connected to capacity 1 in the closed condition of switch 9.

In this improved circuit-arrangement, the desired maximum voltage of the capacity may be made adjustable without entailing a change in the breakdown voltage of the spark-gap by making variable either shunt resistance 14 or limiting resistance 12 or both of them. In the drawing, shunt resistance 14 is represented by a variable resistance.

According to the invention, a minimum quantity of energy is taken from the battery 5 which may therefore be of low power and light weight. The maximum operating voltage of capacity 1, once adjusted, is in every instance attained accurately so that, for example, when a flashlamp for photographic purposes is fed by the capacity there is generated the same quantity of light whenever the lamp is used.

What I claim is:

1. Apparatus for charging a capacity from which energy is withdrawn discontinuously comprising a source of direct voltage constituted by a low voltage supply and a converter whose input terminals are connected to said supply and whose output terminals are connected to said capacity to produce a relatively high charging voltage therefor, a relay including first and second coils and first and second normally open mechanically coupled switches operating in the same direction, said first coil when energized causing said switches to close and said second coil when energized counteracting the effect of said energized first coil whereby said switches reopen, means interposing said first switch between said low voltage supply and the input terminals of said converter, and a spark-gap connected through second coil in series with said second switch across the output terminals of said converter, said gap being rendered conductive when said capacity attains a predetermined value.

2. An arrangement, as set forth in claim 1, wherein the series circuit constituted by said spark-gap, said second coil and said second switch further includes a limiting resistance element.

3. An arrangement, as set forth in claim 2, further including a condenser connected across the serially-connected spark-gap and second coil in said series circuit.

4. An arrangement, as set forth in claim 3, further including a resistance shunted across said condenser.

5. An arrangement as set forth in claim 4, wherein said shunt resistance is variable.

6. Apparatus for charging a capacity from which current is drawn discontinuously comprising a source of direct voltage connected to said capacity to charge same, a circuit connected in shunt relation with said capacity to derive therefrom in the condition where the capacity attains a predetermined charge, a control current, means responsive to said control current to disconnect said charging source from said capacity, and means responsive to said control current to interrupt said shunt circuit whereby said shunt circuit ceases to draw current from said capacity and said charge source remains disconnected.

THEO WILLEM WILLEMSE.

REFERENCES CITED

The following references are of record in the file of this patent:

UNITED STATES PATENTS

| Number | Name | Date |
|---|---|---|
| 1,508,237 | Murdock | Sept. 9, 1924 |
| 2,102,883 | Bouwers | Dec. 21, 1937 |
| 2,250,102 | Klemperer | July 22, 1941 |
| 2,295,293 | Rogers | Sept. 8, 1942 |
| 2,383,492 | Klemperer | Aug. 28, 1945 |
| 2,441,822 | Klemperer | May 18, 1948 |
| 2,468,080 | Klemperer | Apr. 26, 1949 |